UNITED STATES PATENT OFFICE 2,031,299

TREATING COPPER ANODE MUD

Jesse O. Betterton and George H. Weis, Metuchen, N. J., assignors to American Smelting and Refining Company, New York, N. Y., a corporation of New Jersey No Drawing. Application January 31, 1934, Serial No. 709,117

8 Claims. (Cl. 75—18)

This invention relates to the treatment of anode mud (slimes) produced in the electrolytic refining of copper.

Among other features, the invention provides for the removal of copper from the anode mud by a wet process as the initial step in the recovery of precious metal values.

In accordance with the invention, copper anode mud is agitated with copper refining electrolyte or a solution of sulphuric acid in the presence of air and iron sulphate with the result that the copper originally present in the mud passes into solution leaving all precious metals and objectionable impurities such as selenium and tellurium in the residue.

In practicing the invention, the anode mud may be washed or swept from the bottoms of the electrolytic tanks and delivered to a leaching tank by a suitable system of launders and pumps. After settling, the wash water may be decanted and a suitable volume of copper refining electrolyte containing a relatively small amount of iron sulphate introduced into the tank containing the mud. The mud is then agitated with air, which treatment is continued until practically all of the copper has passed into solution, after which the mud is allowed to settle and the copper enriched solution decanted. The residue may then be washed with water, the wash water decanted and the residue placed in a filter press. Thereafter, the practically copper-free residue is sent to the smelting furnace for the next step in the recovery of the precious metals and the enriched copper refining electrolyte returned to the tank house.

If desired, a solution of sulphuric acid may be substituted for the copper refining electrolyte. In either case, however, the copper enriched solution may be returned to the tank house electrolyte inasmuch as no objectionable impurities, such as selenium, tellurium and silver, enter the solution with the copper from the anode mud.

When anode mud is thus agitated with copper refining electrolyte or a solution of sulphuric acid by air in the presence of iron sulphate, it is believed that the small amount of iron sulphate (0.5 grams per liter has been found ample and sufficient) acts somewhat in the nature of a catalyst in that the iron in the ferrous state is oxidized to ferric sulphate which dissolves the copper forming copper sulphate and ferrous sulphate, which latter is in turn reoxidized, and the cycle continued until practically all of the copper has entered into solution. The following are believed to be the reactions involved:

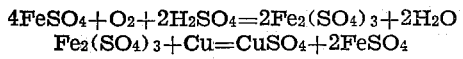

$$Fe_2(SO_4)_3 + Cu = CuSO_4 + 2FeSO_4$$

No special apparatus is required for practicing the process of the invention it only being necessary to provide a suitable tank or chamber in which the mud and the copper refining electrolyte or sulphuric acid may be suitably agitated with air in the presence of a small quantity of ferrous or ferric sulphate. As has been pointed out above, the mud with copper refining electrolyte is transferred from the electrolytic cells directly to a settling tank and, after settling, the supernatant electrolyte is decanted from the mud, which is then transferred directly, without any intermediate treatment, not even pressing or drying, to the leaching tank, where the mud in entirely its raw condition is subjected to the leaching action of copper refining electrolyte or sulphuric acid, while being agitated in the presence of air and a small quantity of ferrous or ferric sulphate. For reasons of economy, it is preferred to carry out the leaching operation in the cold or at atmospheric temperature, for while the time of leaching is shortened by increasing the temperatures, the advantages gained in this respect are more than offset by the cost of fuel, power, labor, etc., entailed in the application of effective amounts of heat to the leaching tank.

As compared to other methods commonly employed in the treatment of copper anode mud and the recovery of precious metals therefrom, the present invention offers many decided advantages. The time during which the precious metals are tied up in process is materially reduced. All necessity for effecting a preliminary roast of the mud before leaching is eliminated, thus saving time, eliminating dust and fume losses, effecting savings in equipment and labor and substantially reducing processing costs. Further, the copper is readily removed without contamination by objectionable impurities, such as selenium and tellurium, and may be directly recovered as pure electrolytic copper.

While certain novel features of the invention have been disclosed and are pointed out in the annexed claims, it will be understood that various omissions, substitutions and changes may be made by those skilled in the art without departing from the spirit of the invention.

What is claimed is:

1. The method of treating anode mud produced in the electrolytic refining of copper which comprises agitating said mud in previously untreated condition with copper refining electrolyte in the presence of air and a small quantity of iron sulphate.

2. The method of treating anode mud produced in the electrolytic refining of copper which comprises agitating said mud in raw and undried condition with a solution of sulphuric acid in the presence of air and a small quantity of iron sulphate.

3. In treating copper anode mud, the improvement which comprises adding copper refining electrolyte to said mud in previously untreated condition and agitating same with air in the cold and in the presence of iron sulphate whereby the copper in the mud enters the solution unaccompanied by objectionable impurities, such as selenium and tellurium.

4. In treating anode mud produced in the electrolytic refining of copper, the improvement which comprises separating the copper in the mud from the precious metals contained therein by agitating the raw and undried mud with copper refining electrolyte at atmospheric temperature and in the presence of air and iron sulphate thereby dissolving the copper.

5. The process of treating copper anode mud produced in the electrolytic refining of copper, which comprises transferring the said mud in raw condition from the electrolytic cells to a leaching tank without any intermediate pressing or drying of the mud, and leaching the said raw mud with copper refining electrolyte in the presence of air and iron sulphate until substantial amounts of copper have been leached from the mud.

6. The process of treating copper anode mud produced in the electrolytic refining of copper, which comprises transferring the mud in raw condition from the electrolytic cells to a leaching tank without any intermediate pressing or drying of the mud, cold leaching the said raw mud with a sulphuric acid solution in the presence of air and iron sulphate until substantial amounts of copper have been leached from the mud, separating the resulting copper-enriched solution from the residual mud, and recovering the copper from the said solution.

7. The process of treating copper anode mud produced in the electrolytic refining of copper, which comprises leaching the said mud in raw and untreated condition with copper refining electrolyte in the presence of air and iron sulphate as a catalyst, recovering the copper from the resulting copper-enriched solution, and preparing the residual mud for smelting into bullion.

8. The process of treating copper anode mud produced in the electrolytic refining of copper, which comprises cold leaching the said mud in raw and previously untreated condition with copper refining electrolyte in the presence of air and iron sulphate as a catalyst, until substantial amounts of copper have been dissolved from the mud.

JESSE O. BETTERTON.
GEORGE H. WEIS.